United States Patent [19]

Downey et al.

[11] 4,121,194

[45] Oct. 17, 1978

[54] TAKE-OFF WARNING SYSTEM FOR AIRCRAFT

[75] Inventors: Thomas James Downey, Seattle; Peter Dennis Turnbull, Renton; James Walter Gayther, Seattle, all of Wash.

[73] Assignee: The Boeing Company, Seattle, Wash.

[21] Appl. No.: 728,357

[22] Filed: Sep. 30, 1976

[51] Int. Cl.$^2$ .............................................. G08B 29/00
[52] U.S. Cl. ................................ 340/27 R; 73/117.4; 73/178 T; 328/133; 244/53 R
[58] Field of Search ............ 340/27 R, 27 AT, 27 SS; 328/133; 73/117.4, 178 T, 117.3; 235/150.22; 364/424, 431; 318/565, 638; 244/53 R

[56] References Cited

U.S. PATENT DOCUMENTS

| | | | |
|---|---|---|---|
| 2,917,731 | 12/1959 | Rodgers | 340/27 R |
| 3,413,844 | 12/1968 | Schafer | 73/117.4 |
| 3,469,196 | 9/1969 | Cowin et al. | 328/133 |
| 3,538,760 | 11/1970 | Atkey et al. | 235/150.22 |
| 3,539,930 | 11/1970 | Strole | 328/133 |
| 3,736,796 | 6/1973 | Hohenberg | 340/27 R |
| 3,852,956 | 12/1974 | Martin | 73/117.3 |

Primary Examiner—John W. Caldwell, Sr.
Assistant Examiner—James J. Groody
Attorney, Agent, or Firm—Conrad O. Gardner; Bernard A. Donahue

[57] ABSTRACT

A logic controlled take-off warning system having a circuit for enabling the logic controlled take-off warning system at engine thrust levels exceeding a predetermined value which is less than minimum take-off thrust of the aircraft and greater than trust required for normal ground operations, provided also that the aircraft is on the ground. When the logic controlled take-off warning system is enabled, a take-off warning horn is subsequently energized when any one of a plurality of undesired take-off configurations exists.

6 Claims, 4 Drawing Figures

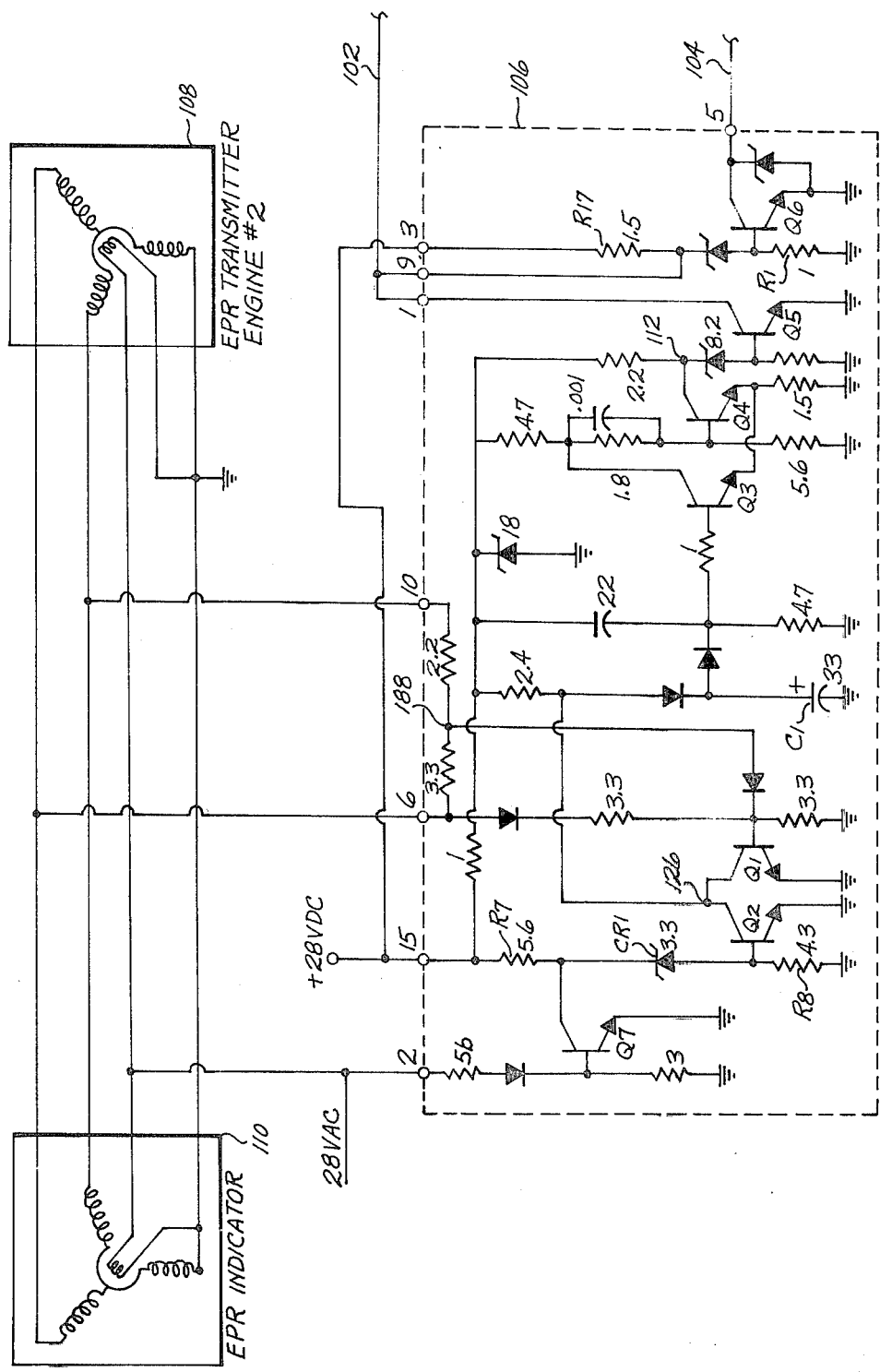

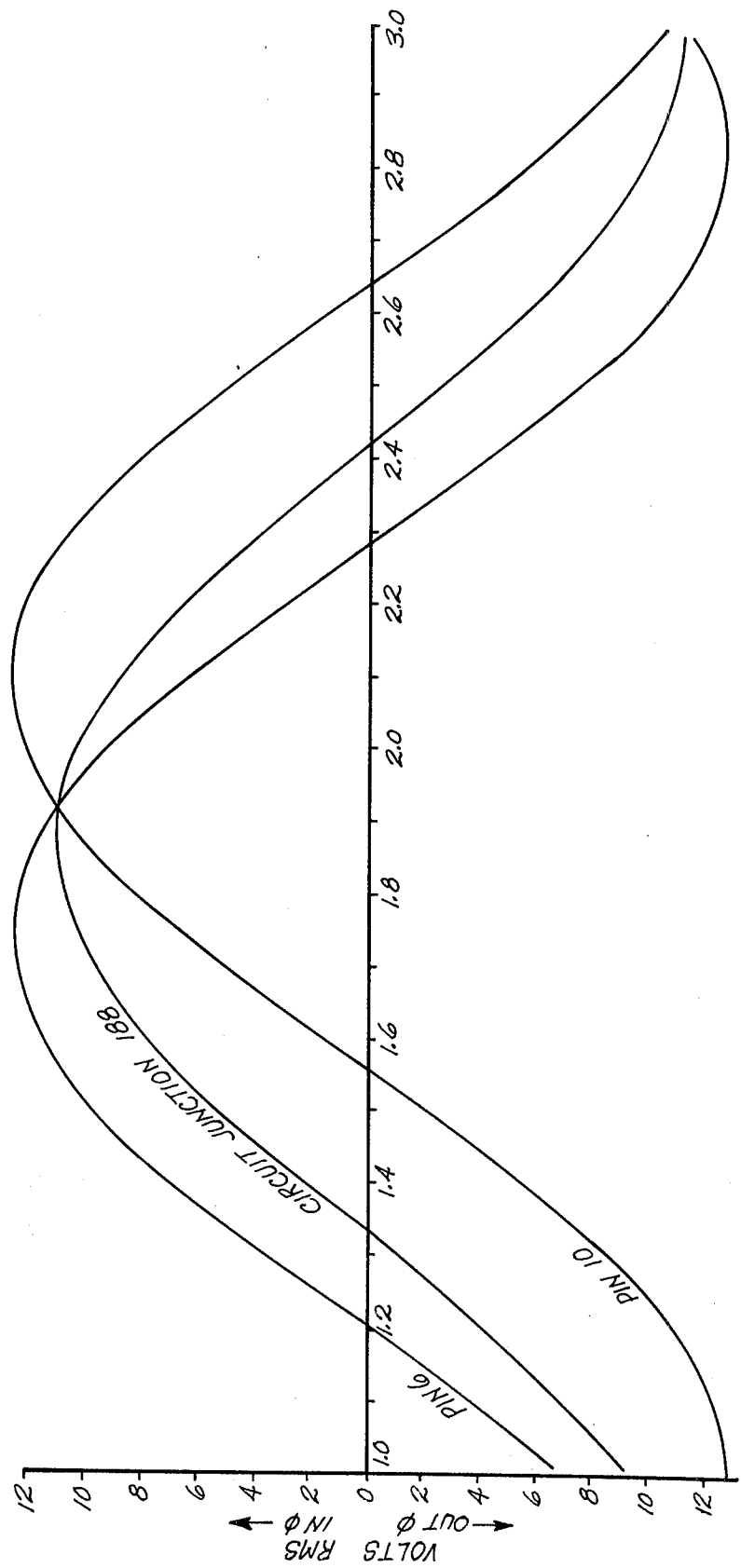

TAKE-OFF WARNING SYSTEM FOR AIRCRAFT

This invention relates to take-off warning systems for aircraft and more particularly to take-off warning systems for providing warning signals when the airplane configuration is not correct and a take-off is attempted.

Prior art take-off warning systems have provided warning signals utilized to warn the flight crew if a take-off was attempted when the aircraft was in an improper configuration for take-off. These systems have utilized enabling means comprising thrust control lever advancement to a position representative of take-off thrust produced by the engine. Such position is variable with temperature for engines utilizing hydro-mechanical fuel control units, and with take-off procedure. Due to these variations, the motion of the thrust control lever to achieve take-off thrust is small at low ambient temperatures. To ensure enabling of the warning system at low temperatures during take-off, this small motion is utilized to enable the warning system. As a consequence, at higher ambient temperatures, the warning system is enabled during ground operations other than take-off, because the thrust control motion lever position to initiate taxi thrust for the aircraft is greater than that required to enable the warning system. This produces nuisance warnings or requires the take-off configuration to be maintained for ground operations.

It is therefore an object of this invention to provide circuit means for enabling take-off warning systems in response to engine thrust levels less than minimum take-off thrust but greater than normal thrust required for ground operations of the aircraft other than take-off.

It is a further object of this invention to provide signal generating means for providing a logic signal in response to engine pressure ratio exceeding a predetermined level.

It is yet another object of this invention to provide circuit means including phase detection circuits responsive to two a.c. (alternating current) signals representative of engine pressure ratio information for providing take-off warning system enable signals.

It is still another object of this invention to provide circuit means for enabling a take-off warning system in response to engine pressure ratios exceeding a predetermined ratio when the aircraft is on the ground.

In accordance with a preferred embodiment of the invention circuit means for providing take-off warning system enable signals is coupled in circuit path between EPR transmitter and indicator means and responsive to a.c. signals in said circuit path. A preferred feature of the circuit means includes phase detection circuits for providing a reference level (e.g. ground potential) signal when two input a.c. signals are in phase within predetermined limit values.

These and other features, objects and advantages of the invention will become more apparent from the following detailed description of preferred forms thereof, illustrated in the accompanying drawings wherein.

Figure 1B:
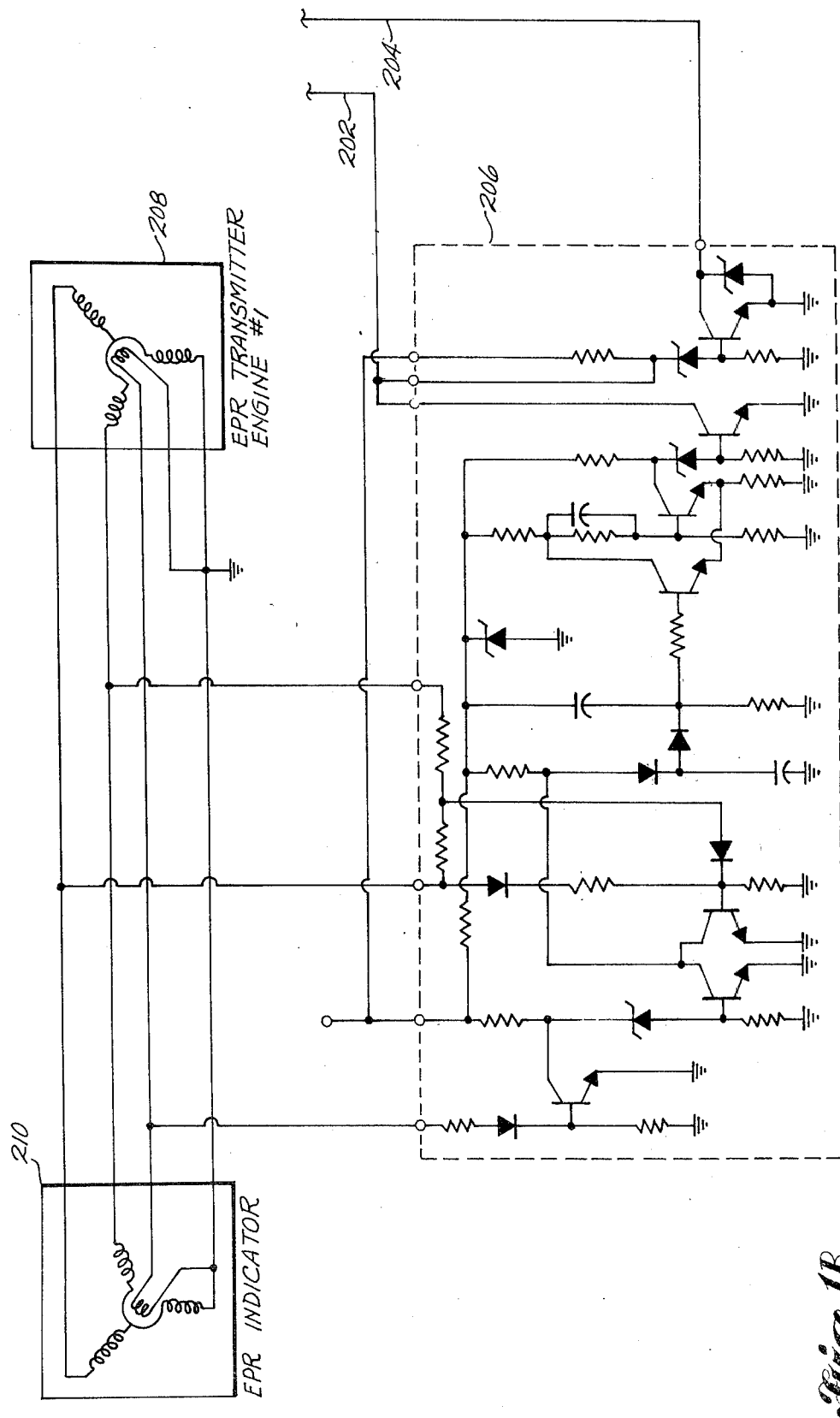
FIG. 1B is a detailed schematic circuit diagram of a second circuit responsive to engine thrust of a second engine of the aircraft for providing a second take-off warning system enable signal.
Figure 1C:
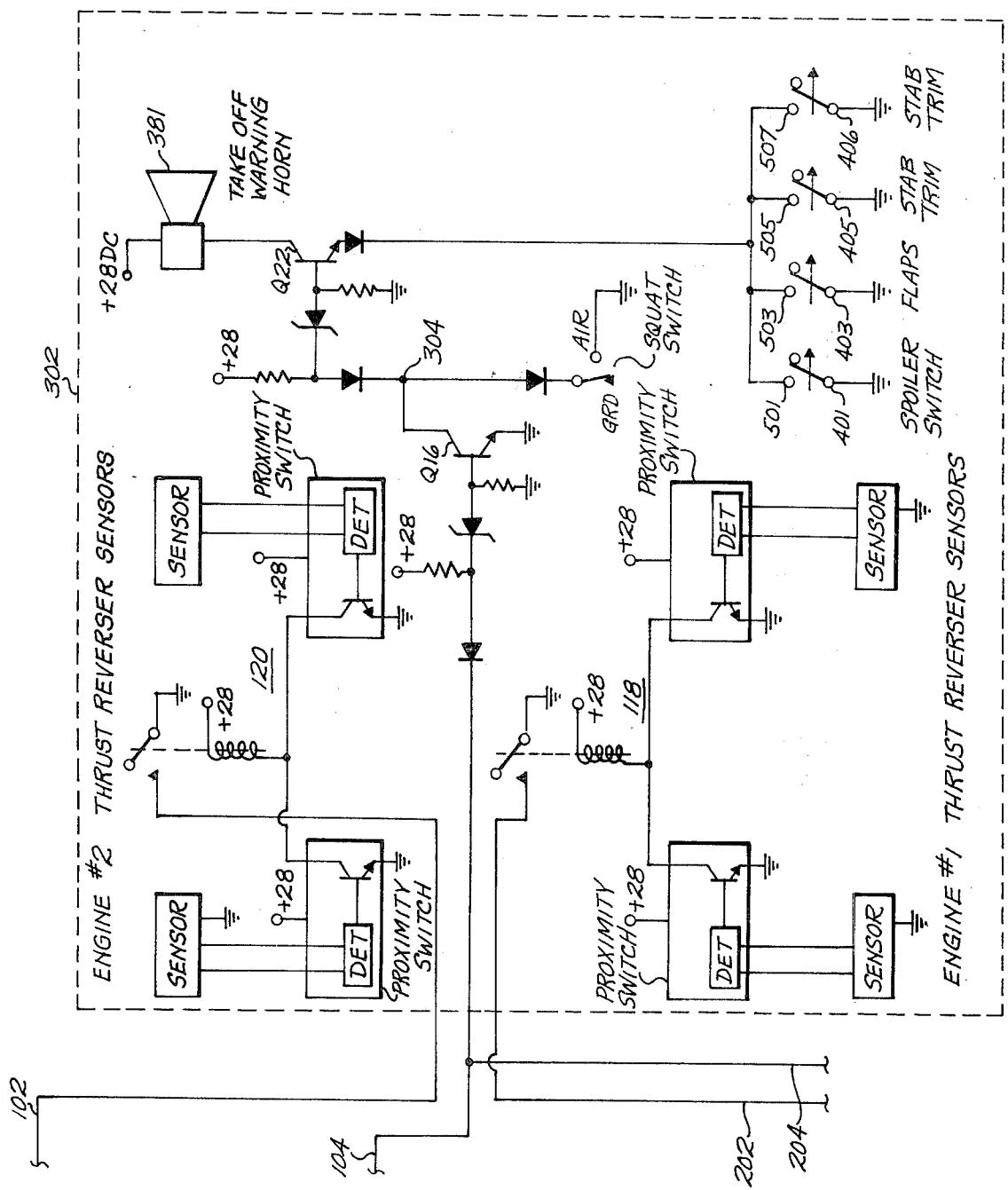
FIG. 1A is a detailed schematic circuit diagram of a first circuit responsive to engine thrust of a first engine of an aircraft for providing a first take-off warning system enable signal.

FIG. 1C is a detailed schematic circuit diagram of a take-off warning system responsive to the first and second take-off warning system enable signals generated by the first and second circuits shown respectively in FIGS. 1A and B connected thereto; and FIG. 2 is a plot of input a.c. voltages versus EPR for the circuits of FIG. 1A and B deemed helpful in better understanding the operation of these circuits.

Turning now to the drawings it will be noted that a preferred embodiment of the present take-off warning system requires the assembly of FIGS. 1 A, B, and C viz. leads 102 and 104 on the right hand side of FIG. 1A continue by electrical conductive connection as the leads correspondingly numbered on the upper left hand side of FIG. 1C, and leads 202 and 204 on the right hand side of FIG. 1B continue by electrical conductive connection as the leads correspondingly numbered on the lower left hand side of FIG. 1C. From the present system as now assembled it should be easily observed upon comparison that signal generating means 206 at the lower left (FIG. 1B) contains circuitry identical to that shown in signal generating means 106 at the upper left (FIG. 1A) and further that signal generating means 206 derives EPR representative information from a first engine of a multi-engine jet transport more specifically from the signal path between EPR transmitter 208 for engine number one and EPR indicator 210 for engine number one which EPR transmitter 208 and EPR indicator 210 are well known instrumentation associated with an engine of an aircraft while signal generating means 106 derives EPR representative information from a second engine of the multi-engine jet transport more specifically from the signal path between EPR transmitter 108 for engine number two and EPR indicator 110 for engine number two which EPR transmitter 108 and EPR indicator 110 are well known instrumentation associated with an engine of an aircraft. The circuitry of FIG. 1A will be described in detail hereinafter and such description will be understood to also apply to the circuit of FIG. 1B, also typical values of circuit components including resistors, capacitors and voltage drops are given in FIG. 1A in order to provide a more complete disclosure for system operation.

Turning now to the portion of the system shown in FIG. 1A, it will be briefly noted prior to more detailed description hereinafter given that the circuitry 106 comprises phase detection circuitry which provides a signal at terminal 112 (collector of transistor Q4) at reference potential viz. ground potential when two input a.c. signals at terminals 2 and 6 are in phase within predetermined limits. Proceeding now to a functional description of circuit 106 operation it will be noted that power is supplied to transistor Q5 through the connection between terminals 1 and 9 since terminal 9 is connected via a 1.5 megohm resistor to terminal 3, but that no power is supplied to transistor Q5 when terminals 1 and 9 are switched to ground or reference potential when engine number two thrust reverser sensing circuits 120 (of FIG. 1C) sense reverse thrust thereby causing lead 102 to be switched to reference potential to prevent warnings at high levels of reverse thrust. Now presuming that a.c. signal inputs (representative of EPR information with respect to engine number 2) to circuit means 106 at input terminals 2 and 6 are in phase, the positive swings of a.c. input signal to input terminal 2 will cause transistor Q7 to be placed in a conductive state. Voltage dividing function provided by R7, CR1 and R8 cause transistor Q2 to conduct except when Q7 is conducting and providing reference or ground potential to the base of transistor Q2. The collector voltage output of transistor Q2 is therefore an inversion of the collector voltage output of transistor Q7. Positive swings of the a.c. input signal derived from the transmitter 108 indicator 110 signal path and applied to terminal 6 cause transistor Q1 to conduct. Since the aforementioned a.c. input signals are presumed to be in phase (thus providing signal information representative of EPR of greater than about 1.4), and since the input signal to transistor Q7 is inverted by transistor Q2, transistors Q1 and Q2 will be conducting alternately. Such alternate placing at reference potential or grounding of the circuit junction 126 of the collectors of transistors Q1 and Q2 prevents transistor Q3 from turning on into a conductive state. Transistors Q3 and Q4 are shown connected in Schmitt trigger circuit configuration. When transistor Q3 is off, transistor Q4 is on or in a conductive state, the base of transistor Q5 is at reference or ground potential with transistor Q5 off and the voltage dividing function provided by R1 and R17 turns transistor Q6 on thereby providing a reference or ground level logic control signal at output terminal 5 for utilization via lead 104 downstream in enabling logic controlled take-off warning circuit 302 of FIG. 1C.

If the a.c. input signals applied to input terminals 2 and 6 begin to shift to an out of phase condition, the off periods of transistors Q1 and Q2 will no longer alternate but will begin to overlap. The voltage level at circuit junction point 126 will rise, capacitor C1 will charge, and transistor Q3 will be turned on when the aforementioned a.c. input signals at input terminals 2 and 6 are out of phase.

When transistor Q3 is turned on, transistor Q4 is turned off permitting the base of transistor Q5 to rise turning transistor Q5 on. When transistor Q5 is on, the base of transistor Q6 is at ground or reference potential, and the reference or ground level (low) logic control signal at terminal 5 is no longer present and terminal 5 is at a potential above reference or ground potential (high) thereby not enabling the logic controlled take-off warning circuit 302 of FIG. 1C via lead 104.

FIG. 2 is believed helpful in showing the potential at the circuit junction 188 intermediate the 3.3 K and 2.2 K resistors connected between input terminals 6 and 10 which potential is coupled via diode means to the base of transistor Q1.

In summary then, if both engine number one and two have an EPR of less than about 1.4, i.e. transistors Q6 in circuits 206 and 106 are both off then high level logic signals are present on leads 204 and 104 respectively and transistor Q16 of logic controlled take-off warning circuit 302 of FIG. 1C is turned on providing a low level logic signal at circuit junction 304 (at the collector of transistor Q16). When engines one or two or both have EPR greater than 1.4 transistor Q16 will be off and a high level logic signal will be provided at circuit junction 304 provided also that the aircraft is on the ground and thus the squat switch has not closed the circuit path to ground or reference potential. This high level logic signal at circuit junction 304 when coupled downstream to the base of transistor Q22 causes transistor 22 to be placed in a conductive state closing the series circuit path between parallel connected logical input terminals 501, 503, 505, 507 of logic controlled take-off warning circuit 302 and alarm signalling utilization means 381 (a take-off warning horn) thereby enabling alarm signalling when any one of a plurality of undesired take-off configurations exists as represented by the closing and completing of the aforementioned series circuit path to ground through any one of switches 401, 403, 405, or 406. Spoiler switch 401 is closed with spoilers of the aircraft up (an unsatisfied logical condition for take-off) providing a circuit path from 28 volts to ground and activating take-off warning horn 381 provided logic controlled take-off warning circuit 302 is enabled by the presence of a low level enable signal on lead 104 or 204 from either enable signal generating circuit 106 or 206 thereby indicating EPR's for engines one or two representative of engine thrust levels greater than the predetermined level, e.g. EPR's greater than about 1.4. Switch 403 is closed in response to flap position outside take-off range configuration providing a ground connection to logic input terminal 503 resulting in closing of the series circuit path through take-off warning horn 381 provided logic controlled take-off warning circuit 302 is enabled by EPR's of engines one or two exceeding 1.4 as provided by signal generating circuits 106 and 206. Similarly when switch 405 is closed providing a logical input to terminal 505 representative of stabilizer position outside take-off range in a nose up direction, take-off warning horn 381 is energized if and only if logic controlled take-off warning circuit 302 is enabled by signal generating circuit 106 or 206. Further logic controlling activation of take-off warning circuit 302 includes a further switch 406 providing a ground input to logic input terminal 507 when stabilizer position is outside take-off range in a nose down direction thus sounding an alarm through take-off warning horn 381 if logic controlled take-off warning circuit 302 has been enabled by signal generating circuits 106 or 206 in the manner hereinbefore described.

What is claimed is:

1. In combination in a multi-engine jet transport:
   first means associated with a first engine for providing first signals representative of the thrust of said first engine;
   second means associated with a second engine for providing second signals representative of the trust of said second engine;
   logic controlled take-off warning circuit means for providing warning signals in the event one or more logical conditions required for take-off configuration of the aircraft are not satisfied;
   first signal generating means including a phase detection circuit responsive to said first signals for providing third signals representative of thrust levels referenced to a predetermined value equal to or less than required for take-off of said multi-engine jet transport but greater than required for other ground operations of said multi-engine jet transport;
   second signal generating means including a phase detection circuit responsive to said second signals for providing fourth signals representative of thrust levels referenced to said predetermined value;
   circuit means responsive to said third and fourth signals for enabling said logic controlled take-off warning circuit to develop warning signals when said third and fourth signals are both representative of thrust levels exceeding said predetermined value and one or more of said logical conditions required for take-off configuration of the aircraft is not satisfied; and said circuit means including thrust reverser sensing circuit means for preventing nuisance warnings in said logic controlled take-off warning circuit means at high levels of reverse thrust.

2. The invention according to claim 1 wherein said referenced value thrust level is representative of an engine pressure ratio of about 1.4.

3. In combination in a take-off warning system for an aircraft having a plurality of engines and a signal path between engine pressure ratio indicator associated with each of said plurality of engines:
- a plurality of signal generating means responsive to said respective plurality of signal paths for providing a plurality of signals representative of thrust levels referenced to a predetermined value;
- a squat switch responsive to on-the-ground condition of the aircraft; and,
- circuit means responsive to said plurality of signals for enabling said take-off warning system to develop warning signals when said plurality of signals representative of thrust levels referenced to a predetermined value are all representative of an engine pressure ratio exceeding about 1.4 and said squat switch is representative of said on-the-ground condition.

4. In combination in a take-off warning system for an multi-engine aircraft having two a.c. signals representative of engine pressure ratio information:
- means for providing take-off warning system enable signals for enabling said take-off warning system when the aircraft is in an on-the-ground condition; said means including phase detection circuits responsive to said a.c. signals and enabling said take-off warning system in response to engine pressure ratio information representative of engine thrust levels of one or more engines of said multi-engine aircraft of greater than a predetermined value, said predetermined value less than minimum take-off thrust but greater than normal thrust required for ground operations of the aircraft other than take-off condition;
- said means further including thrust reverser sensing circuit means for preventing nuisance warnings in said take-off warning system at high levels of reverse thrust; and,
- alarm signalling utilization means for actuating an alarm in response to enabling of said take-off warning system and upon the occurrence of any one of a plurality of undesired take-off conditions.

5. In combination in an aircraft having a plurality of engines:
- a logic controlled take-off warning circuit for said aircraft;
- circuit means for enabling said logic controlled take-off warning circuit when one or more of said plurality of engines of said aircraft has an engine pressure ratio exceeding about 1.4 and said aircraft is in an on-the-ground condition;
- said logic controlled take-off warning circuit including a plurality of switches representative of undesired take-off configuration conditions for alarm signaling upon enabling of said logic controlled take-off warning circuit and when any one of said plurality of undesired take-off configuration conditions exists.

6. In combination:
- a logic controlled take-off warning circuit for an aircraft; and,
- an enabling circuit having a plurality of input terminals adapted for coupling to a plurality of a.c. voltage signal sources representative of engine pressure ratio information of a plurality of engines of said aircraft and providing at the output terminal thereof a high level logic signal for enabling said logic controlled take-off warning circuit when the aircraft is on the ground and one or more of said plurality of engines has an engine pressure ratio exceeding a predetermined level and providing a low level logic signal when said plurality of engines have engine pressure ratios less than said predetermined level, said enabling circuit including a plurality of series connected phase detection circuit means and Schmitt trigger circuit means connected between said plurality of input terminals and said output terminal, said enable circuit further including a squat switch coupled between said output terminal and a reference potential for preventing enabling of said logic controlled take-off warning circuit when the aircraft is not on the ground; and,
- a plurality of thrust reverser sensing circuit means coupled in circuit between said plurality of series connected phase detection circuit means and Schmitt trigger circuit means and said output terminal for preventing nuisance warnings in said logic controlled take-off warning circuit at high levels of reverse thrust.

* * * * *